April 12, 1949.  W. H. WOODWARD  2,467,175
BASE FOR PORTABLE DEVICES
Filed Oct. 18, 1944
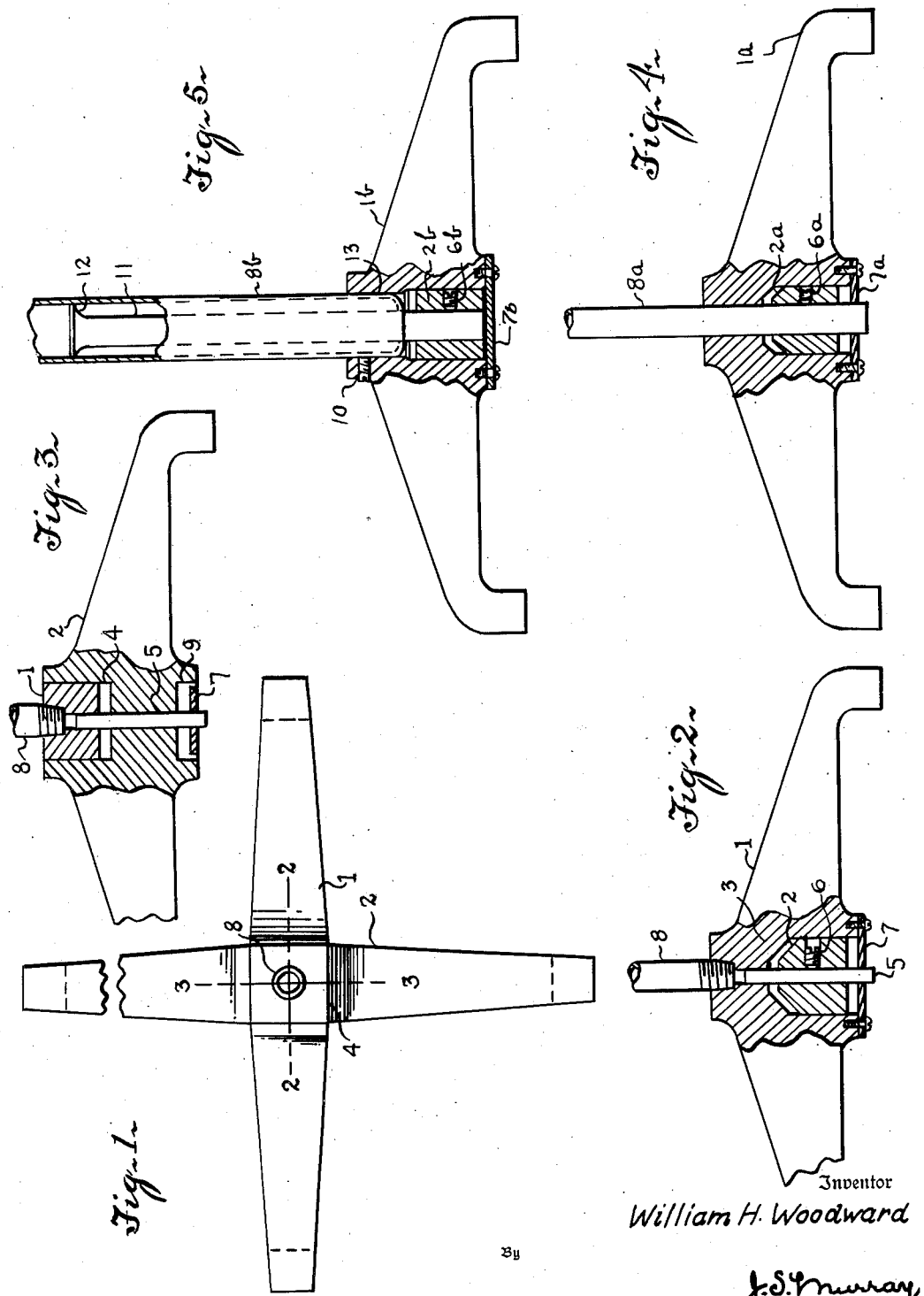
Inventor
William H. Woodward
By
J. S. Murray
Attorney Patented Apr. 12, 1949

2,467,175

UNITED STATES PATENT OFFICE 2,467,175

BASE FOR PORTABLE DEVICES

William H. Woodward, Detroit, Mich.

Application October 18, 1944, Serial No. 559,187

10 Claims. (Cl. 248—194)

This invention relates to bases for portable devices, such as tables, costumers, lamp or fan standards, dental and surgical appliances, and machine tools.

Floor-engaging bases of portable appliances in many instances impose an unstable equilibrium on such appliances through failure to engage a floor at all intended points. Such failure is in some instances due to construction of the bases but more commonly results from uneven floors. To avoid wobbling or vibration of bases thus lacking stability, inserts of some nature are often used and these are disturbed by any change in location of the appliance. A base limited to three points of support is safeguarded from wobbling and vibration, but such a base is poorly suited to any tall appliance, allowing it to be easily upset at least in certain directions.

The object of the invention is to provide a base having four or more points of support and self adjustable to assure engagement of all such points with an uneven floor.

A further object is to provide a base comprising two or more cross members and having at least one thereof vertically slidable relative to the others to assure the proper exercise of a supporting function by all said members.

These and various other objects are attained by the constructions hereinafter described and illustrated in the accompanying drawing, wherein:

Fig. 1 is a top plan view of a base embodying one form of my invention.

Fig. 2 is a side elevational view thereof partly in section on 2—2 of Fig. 1.

Fig. 3 is a transverse elevational view, partly in section on 3—3 of Fig. 1.

Fig. 4 is an elevational view in partial section of a modified embodiment of the invention.

Fig. 5 is a similar view of a further modification.

Describing these views now in greater detail and referring first to the disclosure of Figs. 1, 2, and 3, the reference characters 1 and 2 designate two transversely crossed horizontally elongated base members, preferably slightly arched as shown so as to form feet terminally of said members. The member 1 is transversely formed midway of its length with a groove 3 upwardly extending from its lower edge and the member 2 has a similar groove 4 downwardly extending from its upper edge, these grooves adapting the base members to interfit centrally thereof. This interfitting relation allows said members to slide relatively up and down, without material deviation from their transverse relation and without relative tilting of said members in their vertical planes. To afford greater assurance against divergency of the vertical axes of the members 1 and 2, it is preferred to centrally secure an upright pin 5 in the member 2, as by a set screw 6, and to accurately guide the end portions of such pin in the member 1. The latter member is drilled to receive the upper portion of said pin and has a plate 7 secured to its under face and bridging the groove 3 to guide the lower portion of the pin. A predetermined clearance is provided by the grooves 3 and 4 for relative sliding of the two members, such clearance being substantially equal above and below the member 2 when the base rests on a plane or even surface. The member 1 is rigidly and centrally engaged by the lower end of a standard 8, illustrated as a tube threaded into said member. The bottom of the member 2 is recessed at 9 to permit the plate 7 to shift upwardly with the member 1 or vice versa. It is one of the advantages of this construction that the base may be suited to different diameters of standards by merely proportioning the socket of the member 1 to receive any such standard.

The described construction secures the advantage of compensating for such unevenness of a supporting surface as is commonly encountered in use of portable appliances. In present practice as regards bases having four points of support, the effect of an uneven supporting surface is to prevent proper functioning of the base at one of said points, allowing the appliance to wobble or vibrate. This is always objectionable and often decidedly so as in the case of dining tables. In my construction, if one or several of the feet of the base encounters a depressed or raised portion of a floor, the entire base tilts slightly while the members 1 and 2 slide relatively to still assure a four point support, the relative play of said members being ample to compensate for any such condition as is likely to be met. It is to be noted that any force laterally acting on the standard 8 or an appliance carried by such standard has no tendency to produce relative sliding of the members 1 and 2, such force being at a right angle to the direction of such sliding.

Referring now to the modification illustrated by Fig. 4, the members 1a and 2a, and plate 7a conform to the previous description. The pin 5 is eliminated, however, and the standard 8a extends slidingly through the member 1a to be secured rigidly in the member 2a by the set screw 6a. This secures substantially the same results as the first described construction, the standard supplementing the groove walls of the two base members in limiting their play to movement coaxial with said standard.

In that form of the invention shown in Fig. 5, the members 1b and 2b and plate 7b conform to previous description. In this construction, a tubular load-carrying standard 8b is rigidly secured by a set screw 10 or other means in a socket of the member 1b and a tubular reinforcement 11 fixed rigidly in the member 2b by a set screw 6b extends a suitable distance up into the standard 8b and has its upper end 11 flared for guiding engagement with the standard. Also the lower end of the standard may be flared inwardly as at 12 for guiding engagement with the reinforcement. By thus providing companion slide bearings with a greater space interval therebetween than in the other two illustrated forms of the invention, a greater assurance against lost motion is obtained.

In any of its illustrated forms, the described self-adjusting base is of substantially the same appearance as rigid bases now common and involves little if any increase of production cost as compared to such common bases. The improved construction is further advantageous in that the cross members of the base are easily assembled and disassembled and hence may be more compactly shipped than bases conforming to present practice.

What I claim is:

1. A base for a portable device comprising two elongated members crossed at their mid portions and having floor-engaging extremities, said mid portions being transversely grooved, one upwardly from its bottom face and the other downwardly from its top face, said members interfitting each in the groove of the other and being each slidable up and down in the groove of the other to compensate for unevenness of a floor supporting the base, and means on said base limiting such relative sliding and holding said members in assembly.

2. A base for a portable device as set forth in claim 1, the last-mentioned means being a plate secured to the upwardly grooved member and bridging the groove of such member.

3. In a base for a portable device as set forth in claim 1, a pin set rigidly into the downwardly grooved member and having its upper extremity slidable in the upwardly grooved member, said limiting means comprising a plate secured to the upwardly grooved member and bridging its groove, and slidably engaged by the lower portion of said pin.

4. In combination, a standard and a base for such standard comprising two elongated members crossed at their mid portions and having floor-engaging extremities and relatively vertically movable, said standard rigidly engaging the upper crossed mid portion, and a pin aligned with said standard and fixed in one of said members and slidably engaging the other.

5. In combination, a tubular standard, a base for such standard comprising two elongated members crossed at their mid portions and having floor-engaging extremities and further comprising a connection between said members affording them relative up and down movement, said standard being rigidly mounted on the upper crossed mid portion, and a reinforcement carried by the lower crossed mid portion extended above the base into said standard and forming with said standard a slide guide for said relative up and down movement.

6. The combination set forth in claim 5, said reinforcement being tubular and having its upper end flared outwardly for guiding engagement with the standard.

7. In combination, a substantially upright standard, a base for such standard comprising two elongated members crossed at their mid portions and having floor engaging extremities and further comprising a connection between said members affording them relative up and down movement, said standard being rigidly mounted on one of said members, and a reinforcement rigidly carried by the other of said members extended upwardly from the base, coaxially with the standard, said standard and reinforcement being disposed one within the other and coacting to guide said cross members in their relative up and down movement.

8. A base for a portable device comprising two elongated members crossed at their mid portions and having floor-engaging extremities, said mid portions being transversely grooved, one upwardly from its bottom face and the other downwardly from its top face, said members interfitting each in the groove of the other and being relatively slidable up and down in said grooves to compensate for unevenness of a floor supporting the base, and a member fixed upon and obstructing the groove of the upwardly grooved member beneath the downwardly grooved member to limit said relative sliding of the grooved members and hold them in assembly.

9. A base for a portable device comprising two elongated members crossed at their mid portions and having floor-engaging extremities, said mid portions being transversely grooved one upwardly from its bottom face and the other downwardly from its top face, said members interfitting each in the groove of the other and being relatively slidable up and down in said grooves to compensate for unevenness of a floor supporting the base, an upright pin fixed in one of said members and slidable in the other, and positioning means for said pin carried by the upwardly grooved member beneath the downwardly grooved member.

10. A base for a portable device comprising two elongated members crossed at their mid portions, one above the other, and having floor-engaging extremities, said mid portions normally having a vertical clearance affording said members a relative up and down travel, a guide for such members in said travel fixed in one of said members and slidable in the other, and a positioning element for said guide mounted on the over-crossing member and engaging the guide beneath the under-crossing member and normally having a vertical clearance from the under-crossing member.

WILLIAM H. WOODWARD.

REFERENCES CITED

The following references are of record in the file of this patent:

UNITED STATES PATENTS

| Number | Name | Date |
|---|---|---|
| 544,835 | Sinton | Aug. 20, 1895 |
| 755,484 | Hargrove | Mar. 22, 1904 |
| 853,468 | Nygren | May 14, 1907 |
| 1,320,611 | Forster | Nov. 4, 1919 |
| 1,571,308 | Vaaler | Feb. 2, 1926 |
| 1,762,545 | Carpenter et al. | June 10, 1930 |
| 1,763,748 | Best | June 17, 1930 |
| 1,899,835 | Thum | Feb. 28, 1933 |